United States Patent
Avila et al.

(10) Patent No.: US 11,029,574 B2
(45) Date of Patent: Jun. 8, 2021

(54) WIRELESSLY CONTROLLED ELECTRICALLY SWITCHABLE WINDOW SYSTEM

(71) Applicant: The Boeing Company, Chicago, IL (US)

(72) Inventors: Steve J. Avila, Renton, WA (US); Nha Thanh Nguyen, Shoreline, WA (US); John Patrick Baron, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 1113 days.

(21) Appl. No.: 15/452,427

(22) Filed: Mar. 7, 2017

(65) Prior Publication Data

US 2018/0257755 A1    Sep. 13, 2018

(51) Int. Cl.
*G02F 1/15* (2019.01)

(52) U.S. Cl.
CPC .................................. *G02F 1/15* (2013.01)

(58) Field of Classification Search
CPC .............................. G02F 1/15; H01M 10/44
See application file for complete search history.

(56) References Cited

U.S. PATENT DOCUMENTS

| 8,292,228 | B2 * | 10/2012 | Mitchell | B60J 3/04 |
| | | | | 244/129.3 |
| 8,632,034 | B2 * | 1/2014 | Mitchell | B64C 1/1484 |
| | | | | 244/129.3 |
| 2008/0042622 | A1 * | 2/2008 | Wong | H02J 7/0069 |
| | | | | 320/162 |
| 2008/0234893 | A1 * | 9/2008 | Mitchell | G08C 17/02 |
| | | | | 701/36 |

FOREIGN PATENT DOCUMENTS

WO    WO2013155467 A1    10/2013

* cited by examiner

*Primary Examiner* — Wen Huang
(74) *Attorney, Agent, or Firm* — Yee & Associates, P.C.

(57) ABSTRACT

A method and system for an electrically switchable window system for an aerospace vehicle. The electrically switchable window system comprises electrically switchable windows and a window controller system connected to the electrically switchable windows. The window controller system receives a group of wireless signals from an onboard network system that controls systems in the aerospace vehicle and changes voltages applied to the electrically switchable windows when the group of wireless signals are received. The changes in the voltages change an amount of light passing through the electrically switchable windows.

22 Claims, 7 Drawing Sheets

WIRELESSLY CONTROLLED ELECTRICALLY SWITCHABLE WINDOW SYSTEM

BACKGROUND INFORMATION

1. Field

The present disclosure relates generally to an improved aircraft and, in particular, to a method and apparatus for controlling light passing through windows in the aircraft.

2. Background

A passenger cabin in a commercial airplane has rows of seats. Some of the seats are window seats in the passenger cabin that are adjacent to windows with window shades. These window shades may be pulled up or down to either let light in or block light from entering the passenger cabin though the windows from the exterior of the commercial airplane.

These mechanical window shades are mechanical parts that increase the weight of the commercial airplane as well as having installation and maintenance costs. Further, over time these window shades may require maintenance or replacement, especially for windows that are part of the automatic over wing exit windows.

The window shades for automatic over wing exit windows are different from window shades installed in other locations on the commercial airplane. These window shades are roller type shades that have a heavier support structure and multiple mechanical parts, as compared to other window shades in other locations in a commercial airplane.

Over wing exit window shades may be prone to binding, working, tearing, and having other types of inconsistencies that occur from exposure to cold temperatures, hot temperatures, sunlight, and other environmental conditions within the pressurized passenger cabin. When binding occurs, the window shade may be difficult to repair through removable and replacement, especially for window shades located at automatic over wing exit windows.

Further, when it is desirable to open or close all the window shades, crew members currently individually open or close each one or request passengers to open or close the window shades. This process takes more time and effort than is desired and may result in delays in operating the aircraft.

Therefore, it would be desirable to have a method and apparatus that take into account at least some of the issues discussed above, as well as other possible issues. For example, it would be desirable to have a method and apparatus that overcome a technical problem with currently used mechanical window shades.

SUMMARY

An embodiment of the present disclosure provides for an electrically switchable window system for an aerospace vehicle. The electrically switchable window system comprises electrically switchable windows and a window controller system connected to the electrically switchable windows. The window controller system receives a group of wireless signals from an onboard network system that controls systems in the aerospace vehicle and changes voltages applied to the electrically switchable windows when the group of wireless signals are received. The changes in the voltages change an amount of light passing through the electrically switchable windows.

Another embodiment of the present disclosure provides for a method for controlling electrically switchable windows in an aerospace vehicle. The method comprises receiving a group of wireless signals at a window controller system from an onboard network system in the aerospace vehicle. The window controller system changes voltages applied to the electrically switchable windows when the group of wireless signals are received. The window controller system changes the voltages applied to the electrically switchable windows when the group of wireless signals are received, wherein a change in the voltages changes an amount of light passing through the electrically switchable windows.

Yet another embodiment of the present disclosure provides for an electrically switchable window system for an aircraft. The electrically switchable window system comprises electronically switchable windows, a battery system and a window controller system. The battery system is connected to the electrically switchable windows and applies voltages to the electrically switchable windows. The window controller system receives a group of wireless signals from an onboard network system in the aircraft and changes the voltages applied to the electrically switchable windows by the battery system when the group of wireless signals are received such that the change in the voltages changes an amount of light passing through the electrically switchable windows.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take in to account that window shades used for automatic over wing exit windows are different from the window shades used in other windows. The illustrative embodiments recognize and take into account that it is desirable to have a consistent appearance and operation of window shades across the different windows in the aircraft.

Further, the illustrative embodiments recognize and take into account that some aircraft use electrically switchable windows that may be dimmed by applying different voltages to the electrically switchable windows. The illustrative embodiments recognize and take into account that these electrically switchable windows may be controlled by a panel in a passenger cabin that is accessible by crew members. Further, these electrically switchable windows also may be controlled by passenger switches accessible to passengers in window seats.

The illustrative embodiments recognize and take into account that currently electrically switchable windows are controlled through voltages applied from switches connected to a controller. The illustrative embodiments also recognize and take into account that it would be desirable to have an electrically switchable window system that provides additional capabilities beyond controlling the switching of electrically switchable windows with passenger switches and a panel in the passenger cabin.

Figure 1:
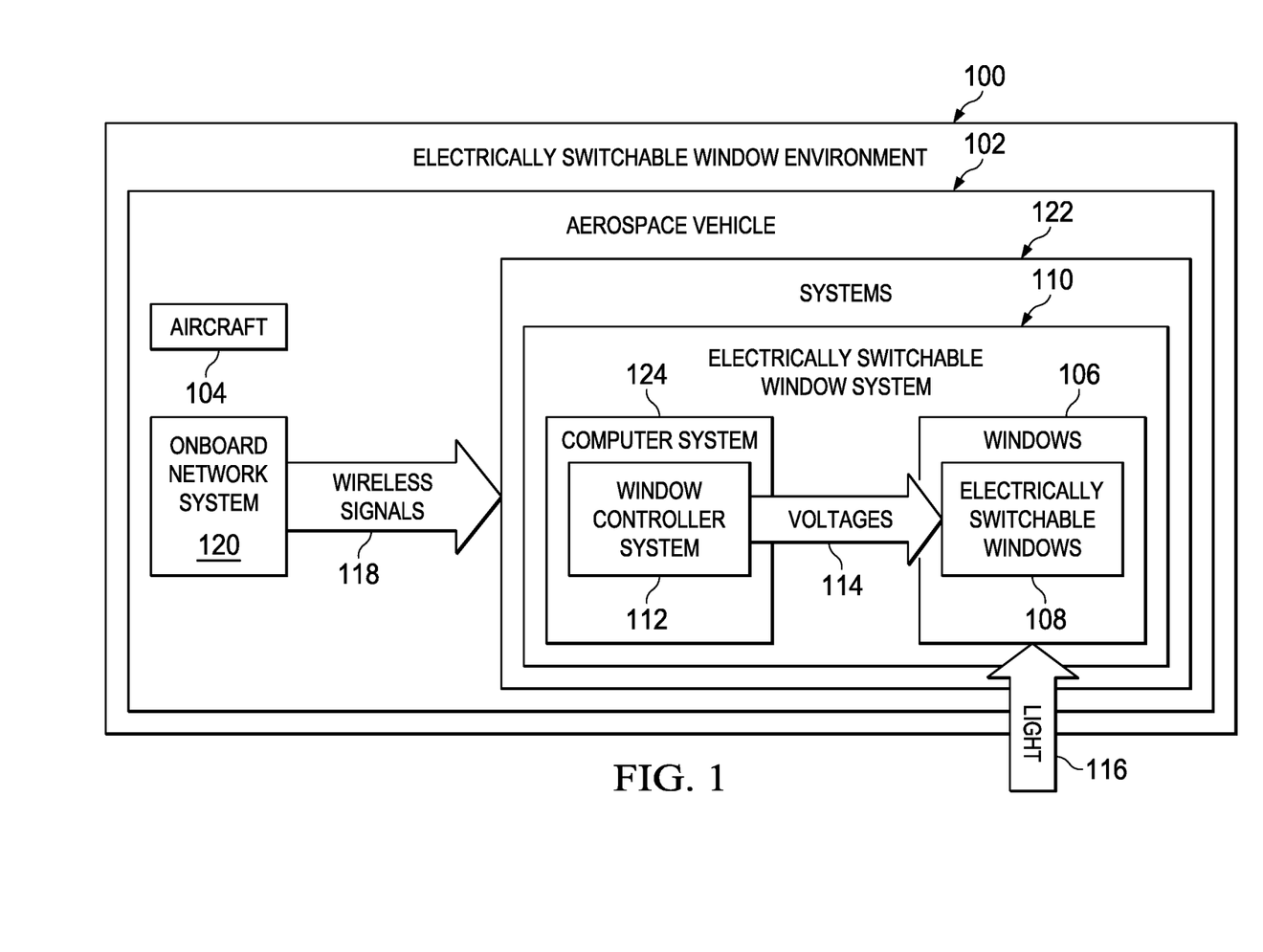
FIG. 1 is an illustration of a block diagram of an electrically switchable window environment in accordance with an illustrative embodiment.

With reference now to the figures and in particular with reference to FIG. 1, an illustration of a block diagram of an electrically switchable window environment is depicted in accordance with an illustrative embodiment. In this illustrative example, electrically switchable window environment 100 includes aerospace vehicle 102. In this example, aerospace vehicle 102 takes the form of aircraft 104. For example, although aerospace vehicle 102 takes the form of aircraft 104, aerospace vehicle 102 may take other forms such as a spacecraft, a space shuttle, a spaceplane, or other suitable type of aerospace vehicle.

Aircraft 104 may take any number different forms. For example, aircraft 104 may be selected from a group consisting of an airplane, a commercial airplane, a rotorcraft, helicopter, a military jet, or other suitable types of aircraft. Aerospace vehicle 102 has windows 106 in the form of electrically switchable windows 108.

As depicted, electrically switchable windows 108 are part of electrically switchable window system 110. In this illustrative example, electrically switchable window system 110 also includes window controller system 112, which is connected to electrically switchable windows 108.

Window controller system 112 applies voltages 114 to electrically switchable windows 108 in a manner that allows for changes in an amount of light 116 passing through electrically switchable windows 108. For example, window controller system 112 receives a group of wireless signals 118 and changes voltages 114 applied to electrically switchable windows 108 when the group of wireless signals 118 are received. The change in voltages 114 applied to electrically switchable windows 108 changes an amount of light 116 passing through electrically switchable windows 108.

In this illustrative example, onboard network system (ONS) 120 transmits the group of wireless signals 118. As depicted, onboard network system 120 sends the group of wireless signals 118 to window controller system 112 in which the group of wireless signals 118 cause window controller system 112 to change voltages 114 applied to electrically switchable windows 108.

Onboard network system 120 is a controller for systems 122 in aerospace vehicle 102. As depicted, onboard network system 120 controls systems 122 in aerospace vehicle 102. In controlling systems 122, onboard network system 120 receives information from systems 122 in addition to sending commands, programs, data, parameters, or other information to systems 122 needed to control the systems. In this illustrative example, electrically switchable window system 110 is a system in systems 122.

In this illustrative example, onboard network system 120 provides a master on-and-off control for the flight deck of aerospace vehicle 102. Additionally, onboard network system 120 also may provide an ability to obtain maintenance and performance data for electrically switchable windows 108.

Further, onboard network system 120 also provides security for systems 122 including electrically switchable window system 110. For example, onboard network system 120 includes a physical architecture as well as software that prevents passengers or other unauthorized persons or devices from accessing onboard network system 120 and systems 122.

As depicted in this example, onboard network system 120 includes for example, a digital flight data acquisition unit (DFDAU) and a network file server (NFS). A display system also may be present in onboard network system 120 that displays data and information to crew members, such as a pilot and a copilot. Systems 122 may include, for example, at least one of a flight control surface system, an engine, a navigation system, an autopilot system, a collision avoidance system, a weather radar system, or other suitable systems.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Window controller system 112 may be implemented in software, hardware, firmware, or a combination thereof. When software is used, the operations performed by window controller system 112 may be implemented in program code configured to run on hardware, such as a processor unit. When firmware is used, the operations performed by window controller system 112 may be implemented in program code and data and stored in persistent memory to run on a processor unit. When hardware is employed, the hardware may include circuits that operate to perform the operations in window controller system 112.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

For example, window controller system 112 may be implemented in computer system 124, which is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system. In one illustrative example, a data processing system may be assigned to apply voltages 114 to a particular window in electrically switchable windows 108

In one illustrative example, one or more technical solutions are present that overcome a technical problem with window shades in an aerospace vehicle, such as an aircraft. As a result, one or more technical solutions in the illustrative examples may provide a technical effect of reducing the maintenance for window shades with the use of electrically switchable windows. The technical effect eliminates the need for mechanical window shades through the use of electrically switchable windows that change the amount of light passing through the electrically switchable windows. Further, another technical effect present in one or more of the illustrative examples is a reduction in weight. Further, electrical switchable windows may be installed during upgrades or retrofits of aircraft and these upgrades or retrofits may be performed at a lower cost and more quickly as compared to replacing mechanical window shades. For example, factory touch time labor is reduced and remove and replace maintenance also is reduced.

Figure 2:
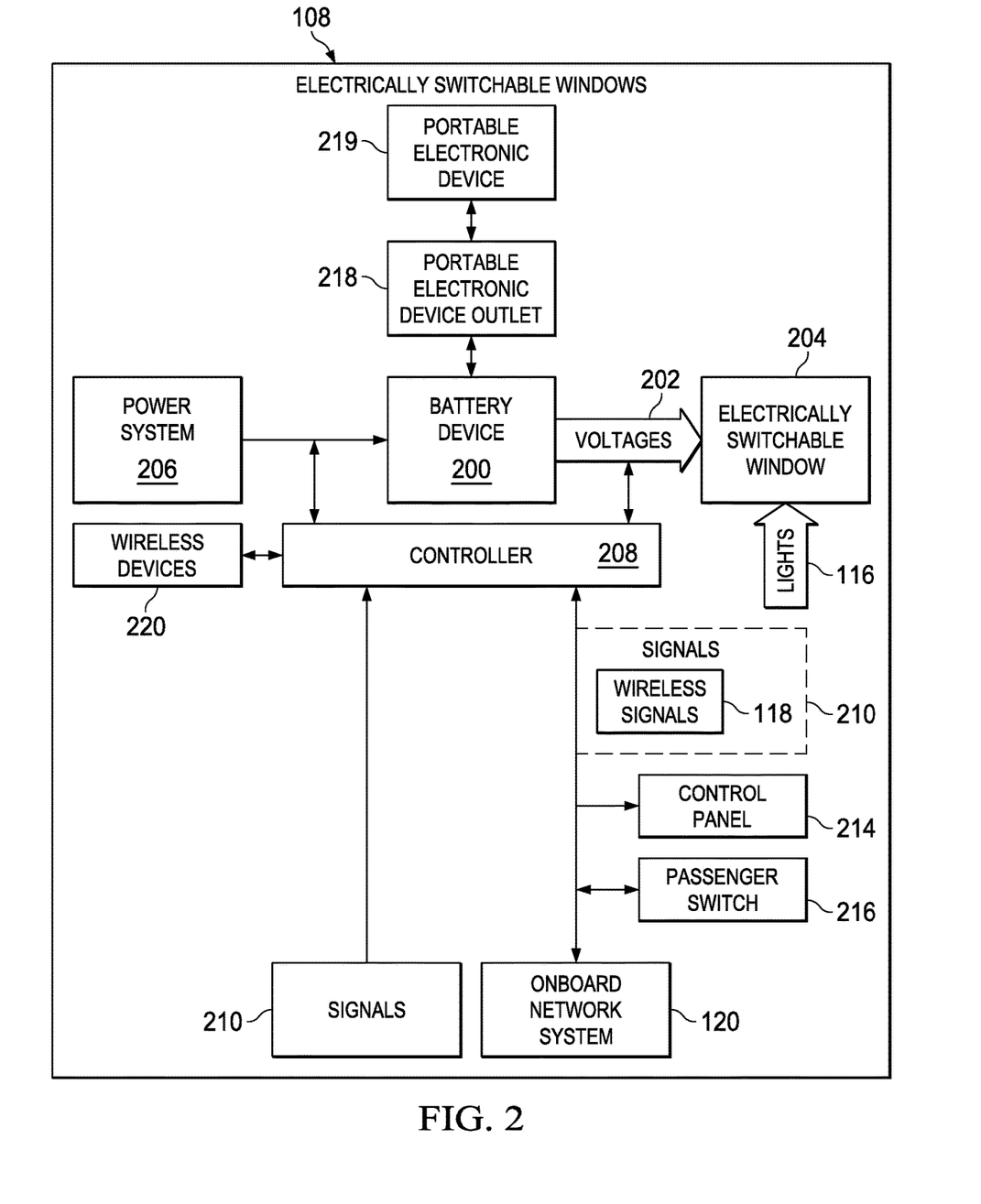
FIG. 2 is an illustration of a block diagram of an electrically switchable window system in accordance with an illustrative embodiment.

With reference next to FIG. 2, an illustration of a block diagram of an electrically switchable window system is depicted in accordance with an illustrative embodiment. This figure depicts an example of one implementation of electrically switchable windows 108 in FIG. 1.

As depicted, electrically switchable windows 108 includes battery device 200 that is connected to electrically switchable window 204 in electrically switchable windows 108. One or more battery devices, such as battery device 200, form a battery system to power electrically switchable windows 108 in FIG. 1. Battery device 200 applies voltages 202 to electrically switchable window 204.

In this illustrative example, electrically switchable window 204 is electrochromic or some other material whose light transmission properties are altered when a voltage is changed or applied to the material. The change may be from translucent to transparent, changing from blocking some or all wavelengths of light to letting those wavelengths of light pass. In this illustrative example, electrically switchable window 204 may be formed using an electrochromic device.

As depicted, battery device 200 may be recharged from power system 206. In this illustrative example, power system 206 is connected to battery device 200.

Controller 208 in window controller system 112, shown in FIG. 1, controls charging of battery device 200 by power system 206. In this illustrative example, controller 208 is shown as a separate functional component. This functional component may be implemented in other blocks rather than as a separate component. For example, the functions of controller 208 may be implemented in another block, such as in battery device 200.

Further, power system 206 may take a number of different forms. For example, power system 206 may be selected from at least one of an auxiliary power unit, an energy harvesting system, a solar panel, a piezo energy harvesting device, a thermal energy harvesting device, or some other suitable type of power source that may be used to recharge battery device 200.

When an energy harvesting device is used, this device may be self-contained as part of electrically switchable window 204. For example, solar cells for solar panels may be formed on electrically switchable window 204. As another example, thermal collectors may be present on air grills or between window panes of electrical switchable window 204. In this manner, the load on the aircraft power systems and fuel costs may be reduced by using energy harvesting devices.

The application of voltages 202 to electrically switchable window 204 is controlled by controller 208 in window controller system 112 in FIG. 1. In this illustrative example, controller 208 may receive signals 210 to control the application of voltages 202 to electrically switchable window 204 which controls the amount of light 116 that passes through electrically switchable window 204.

In the illustrative example, signals 210 may be received from a number of different sources. For example, at least one of control panel 214 or passenger switch 216 may send signals 210 to controller 208. As depicted, control panel 214 sends a group of signals 210 to controller 208 in window controller system 112 to change voltages 202 applied to electrically switchable window 204.

Control panel 214 is depicted as being connected to controller 208. Control panel 214 is also connected to controllers for other windows in electrically switchable windows 108 in addition to electrically switchable window 204.

As depicted, control panel 214 is a panel that may be a physical panel or virtual panel on a touchscreen. Control panel 214 is accessible by crewmembers of the aerospace vehicle 102, shown in FIG. 1, and may be used to control electrically switchable window 204, as well as other electrically switchable windows in electrically switchable windows 108. In this illustrative example, control panel 214 provides on-and-off control of electrically switchable windows 108 such that all of the electrically switchable windows 108 may be controlled by the flight crew for various operation of aerospace vehicle 102.

These operations include, for example, taxiing, takeoff, landing, or other phases of flight or operations in which requirements may be present with respect to the configuration of electrically switchable windows 108. With control panel 214, the flight crew does not have to open or close shades on each window in the passenger cabin.

Further, control panel 214 may have a configuration database that allows for the customization of window controls to include variability and differences in airline configurations, quantity of the electrically switchable windows, differences found between minor models and derivative models of narrow body aircraft, or zonal variability needed due to reconfiguration of zonal control within the electrically switchable windows, and zonal definition of each configuration.

Passenger switch 216 is connected to electrically switchable window 204. Passenger switch 216 is configured for use by passengers. Passenger switch 216 may be a physical switch, a virtual switch on a touchscreen, a touchpad, a touch sensitive controller, or some other type of switch that may be used by passengers. Passenger switch 216 provides a passenger an ability to control their environment, such as allowing different levels of light passing through electrically switchable window 204.

In this manner, controller 208 in window controller system 112 receives a group of signals 210 from at least one of passenger switch 216 or control panel 214 in a passenger cabin of aerospace vehicle 102 and changes voltages 202 applied to electrically switchable window 204 in aerospace vehicle 102 when the group of signals are received.

In yet another illustrative example, onboard network system 120, shown in FIG. 1, may send wireless signals 118 in signals 210 to controller 208. Controller 208 may include wireless functions that followed standards such as IEEE 802.11, IEEE 802.15.4, or other types of wireless standards.

In the illustrative examples, a hierarchy in priority for signals 210 from different sources may be implemented using controller 208. For example, signals 210 received from onboard network system 120 are given the highest priority and override signals from control panel 214 and passenger switch 216. Signals originating from control panel 214 have priority over signals 210 generated by passenger switch 216.

As another feature, portable electronic device outlet 218 is connected to battery device 200. In this manner, a passenger may obtain power for portable electronic device 219. Further, controller 208 also may control wireless devices 220. Wireless devices 220 may provide for extending the range for providing access to a wireless network.

Figure 3:
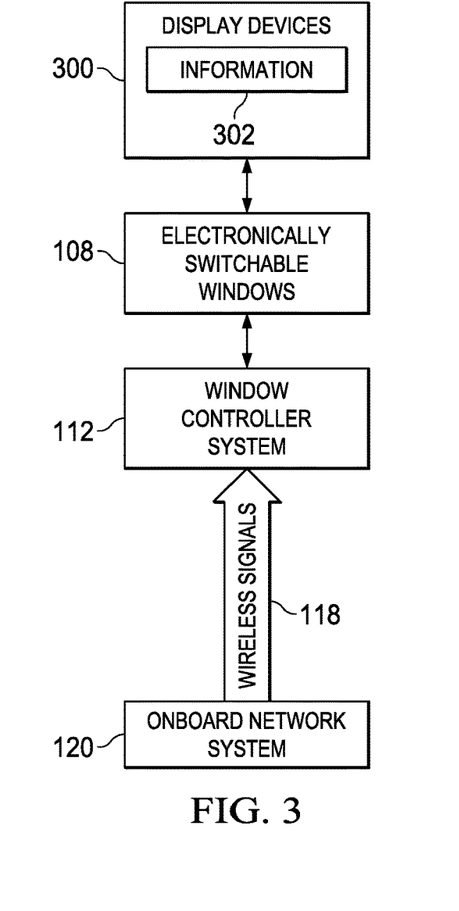
FIG. 3 is an illustration of a block diagram of a display of information on electrically switchable windows in accordance with an illustrative embodiment.

With reference next to FIG. 3, an illustration of a block diagram of a display of information on electrically switchable windows is depicted in accordance with an illustrative embodiment. In this illustrative example, display devices 300 are associated with electrically switchable windows 108. Window controller system 112 controls information 302 displayed on the display devices 300. Window controller system 112 receives information 302 in the group of wireless signals 118 from onboard network system 120 in aerospace vehicle 102 in FIG. 1.

Onboard network system 120 may send information 302 for display in various forms. For example, information 302 may include at least one of flight information, airspeed, weather conditions, a moving map for the flight, announcements, or other types of information 302.

Figure 4:
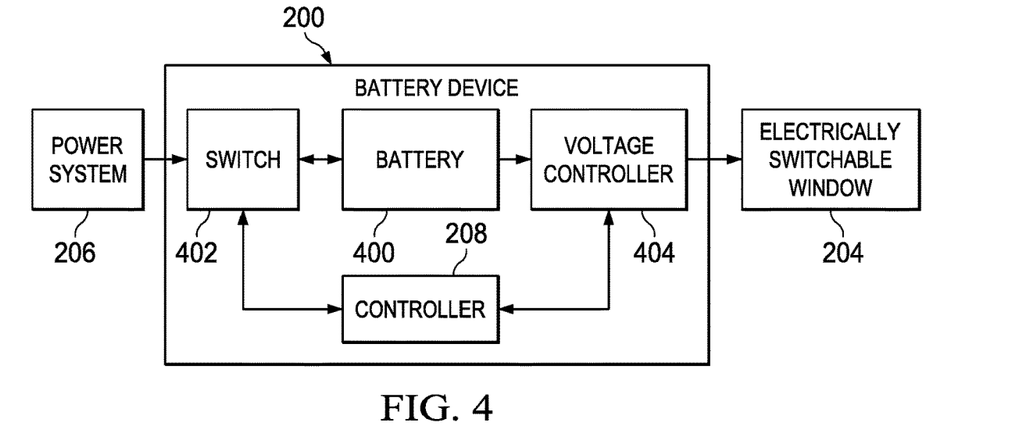
FIG. 4 is an illustration of a block diagram of a battery device in accordance with an illustrative embodiment.

Turning now to FIG. 4, an illustration of a block diagram of a battery device is depicted in accordance with an illustrative embodiment. In this depicted example, battery device 200 comprises battery 400 and controller 208. Controller 208 is located in battery device 200 in this example. In other illustrative examples, controller 208 may be located in another component or as a separate component from battery device 200.

As depicted, battery 400 provides electrical power to controller 208 and electrically switchable window 204. Battery 400 may be implemented using various types of battery technologies. For example, battery 400 may be formed from one or more lithium-ion cells. In one illustrative example, each of controller 208 and electrical switchable window 204 has a battery. In other words, a battery is connected to each controller and electrical switchable window system.

In this illustrative example, controller 208 controls switch 402. Switch 402 is connected to power system 206. Controller 208 controls the opening and closing of switch 402. Switch 402 is open when battery 400 has a charge greater than a threshold. The threshold may be, for example, a 30 percent charge or some other value. If the charge of battery 400 is less than 30 percent, controller 208 closes switch 402 such that power system 206 charges battery 400 in battery device 200.

As depicted, battery 400 is connected to electrically switchable window 204 through voltage controller 404. Controller 208 controls the voltage the battery 400 outputs electrically using voltage controller 404. Voltage controller 404 may be implemented using an adjustable voltage regulator to change the voltage output by battery 400.

Figure 5:
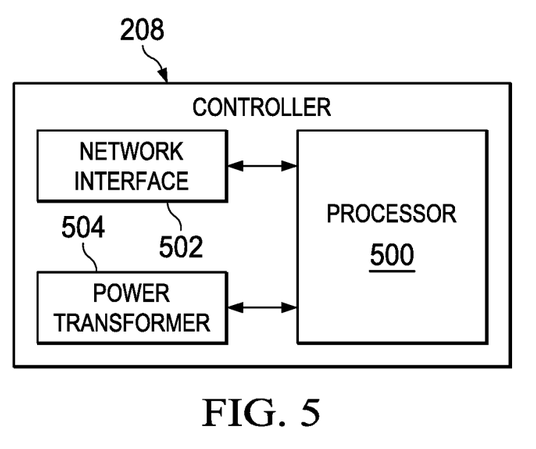
FIG. 5 is an illustration of a block diagram of a controller in accordance with an illustrative embodiment.

With reference now to FIG. 5, an illustration of a block diagram of a controller is depicted in accordance with an illustrative embodiment. In this figure, examples of some components that may be implemented in controller 208 are shown. In this example, controller 208 comprises processor 500, network interface 502, and power transformer 504.

Network interface 502 receives signals. These signals may be transmitted over at least one of electrical signals transmitted over wires, light signals transmitted over optical cables, wireless signals, or other types of signals.

Power transformer 504 may be, for example, an alternating current to direct current (AC/DC) transformer. In this manner, alternating current received from the power source, such as an auxiliary power unit, may be changed into a direct current for charging a battery.

As depicted, processor 500 receives information in signals received over network interface 502. This information may include commands to change the amount of light passing through the electrically switchable window, information to be displayed on a display device associated with the electrically switchable window, parameters for charging a battery, and other suitable types of information.

The illustration of electrically switchable window environment 100 and the different components in FIGS. 1-5 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, wireless devices 220 may be selected from at least one of a wireless extender, wireless repeater, or other wireless devices may be present in window controller system 112 of FIGS. 1-3. As another example, mobile devices carried by passengers may include mobile applications that perform the same function as a passenger switch.

Figure 6:
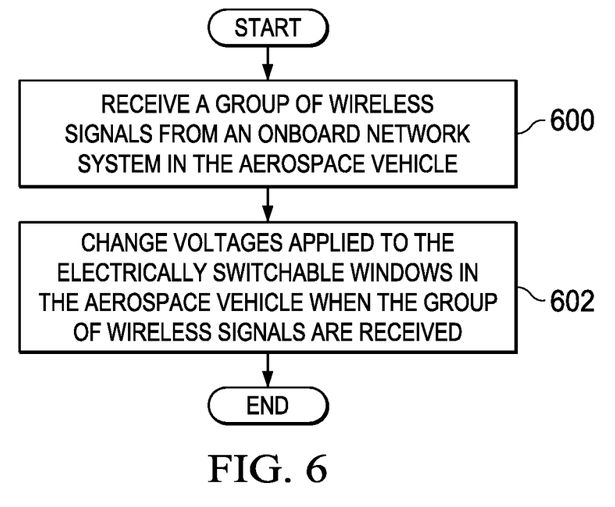
FIG. 6 is an illustration of a flowchart of a process for controlling electrically switchable windows in an aerospace vehicle in accordance with an illustrative embodiment.

Turning next to FIG. 6, an illustration of a flowchart of a process for controlling electrically switchable windows in an aerospace vehicle is depicted in accordance with an illustrative embodiment. The process illustrated in FIG. 6 may be implemented in at least one of hardware or software in window controller system 112.

The process begins by receiving a group of wireless signals from an onboard network system in the aerospace vehicle (operation 600). The window controller system changes the voltages applied to the electrically switchable windows when the group of wireless signals are received.

The process changes voltages applied to the electrically switchable windows in the aerospace vehicle when the group of wireless signals are received (operation 602). The process terminates thereafter. The change in the voltages changes an amount of light passing through the electrically switchable windows.

Figure 7:
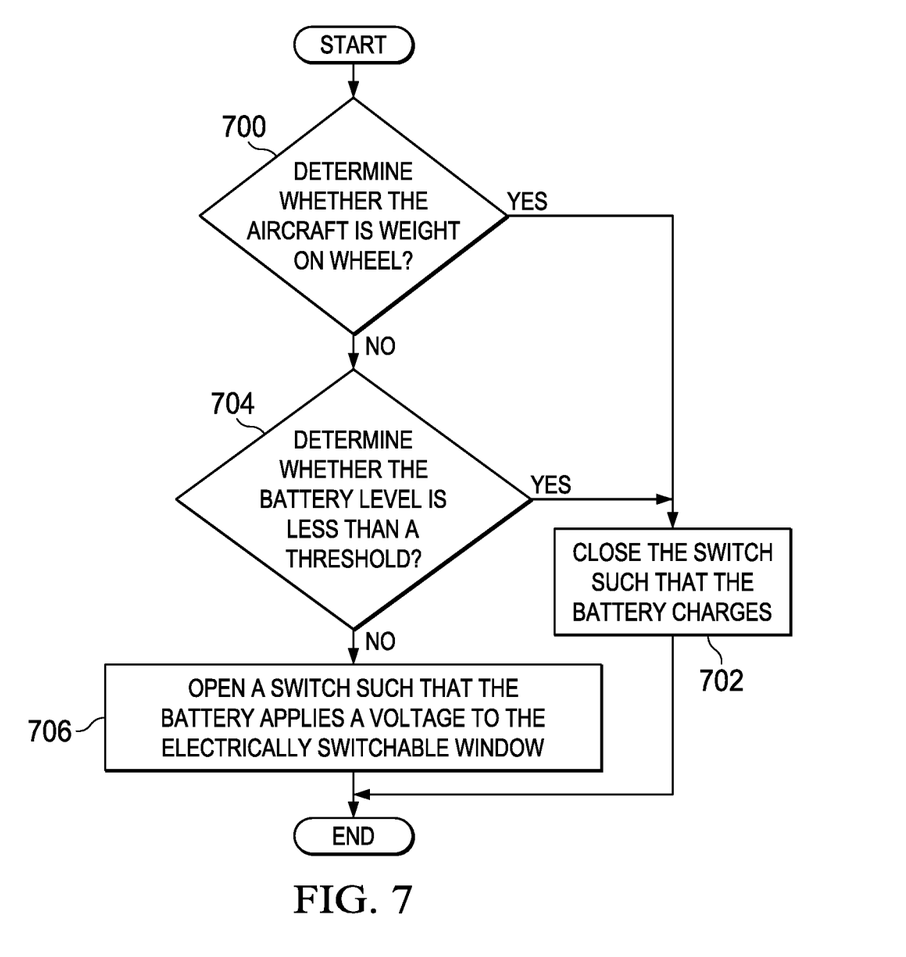
FIG. 7 is an illustration of a flowchart of a process for charging a battery in accordance with an illustrative embodiment.

With reference to FIG. 7, an illustration of a flowchart of a process for charging a battery is depicted in accordance with an illustrative embodiment. The process illustrated FIG. 7 may be implemented in controller 208 in FIG. 2.

The process begins by determining whether the aircraft is weight on wheel (operation 700). If the aircraft is weight on wheel, the process closes the switch such that the battery charges (operation 702), with the process terminating thereafter. If the aircraft is not weight on wheel, the process determines whether the battery level is less than a threshold (operation 704). The threshold may be, for example, a percentage such as 20 percent, 30 percent, or some other suitable percentage.

If the battery level is less than the threshold, the process proceeds to operation 702 as described above. Otherwise, the process opens a switch such that the battery applies a voltage to the electrically switchable window (operation 706), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
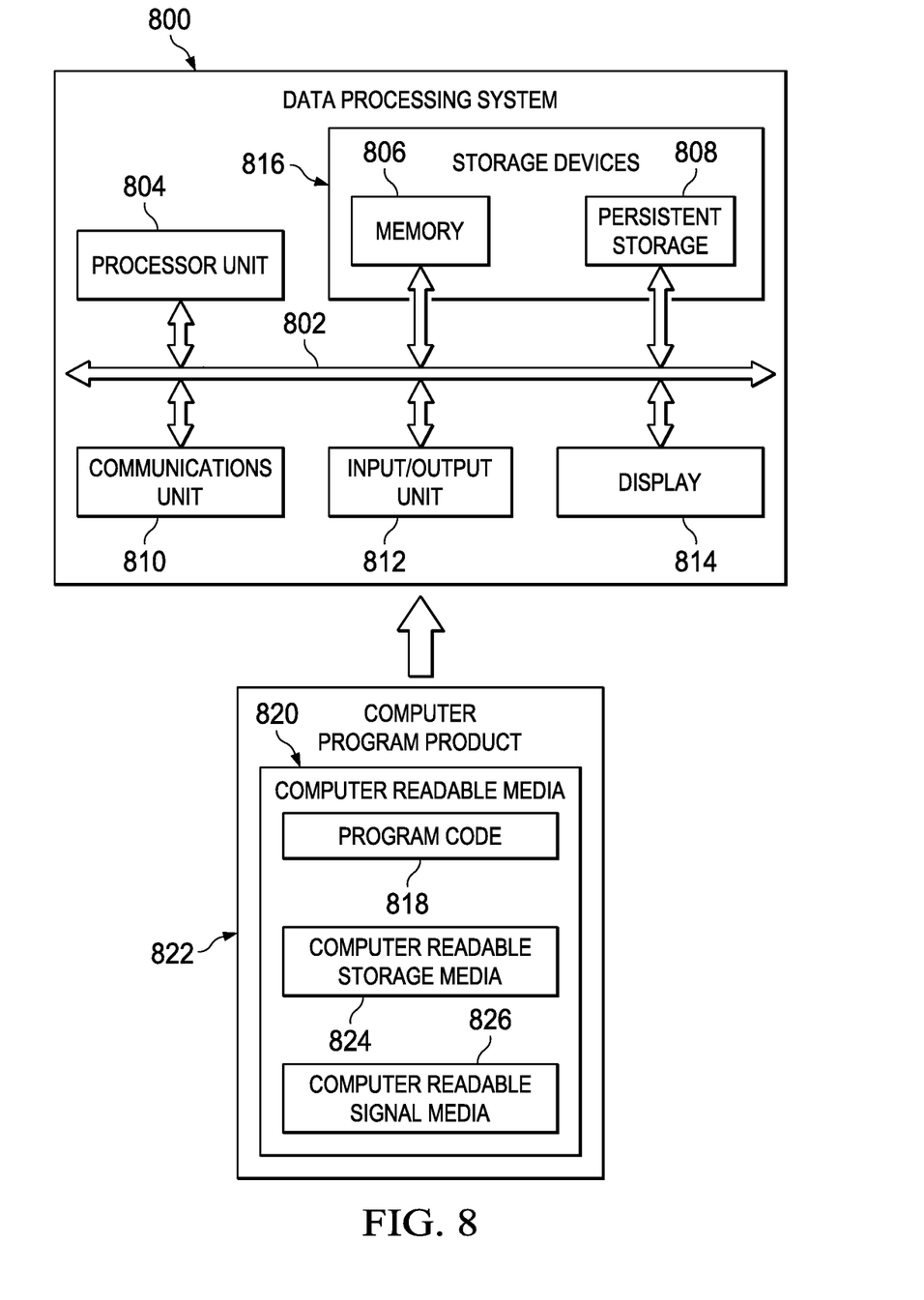
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement data processing systems in computer system 124, onboard network system 120, and systems 122. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components, in addition to or in place of those illustrated, for data processing system 800. Other components shown in FIG. 8 can be varied from the illustrative examples shown. The different embodiments may be implemented using any hardware device or system capable of running program code 818.

Figure 9:
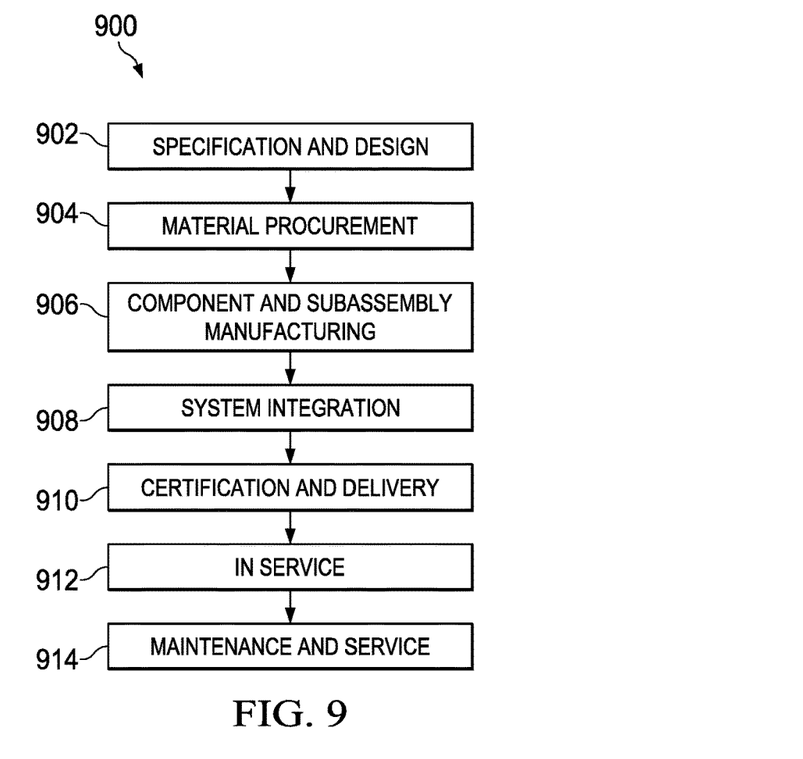
FIG. 9 is an illustration of a block diagram of an aircraft manufacturing and service method in accordance with an illustrative embodiment.
Figure 10:
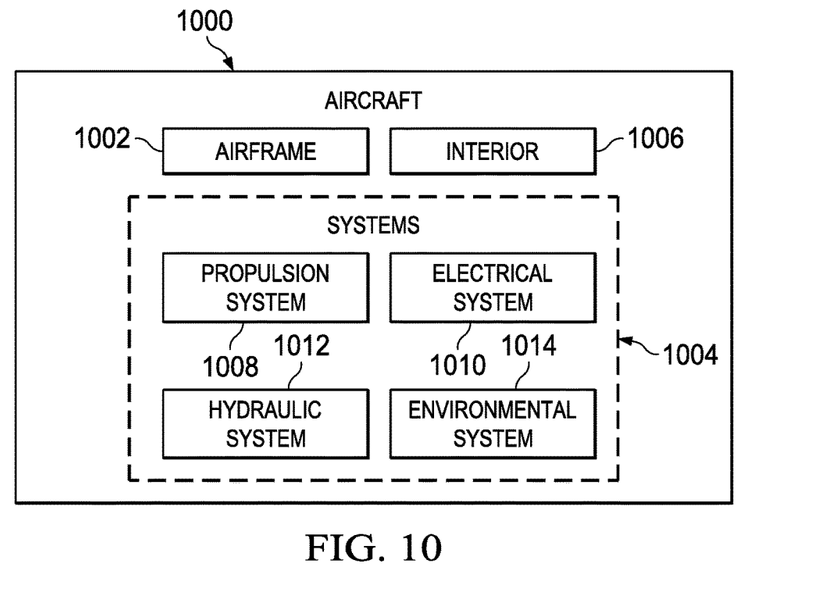
FIG. 10 is an illustration of a block diagram of an aircraft in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. For example, an electrically switchable window system may be installed in aircraft 1000 during system integration 908. Components for the electrically switchable window system may be fabricated during component and subassembly manufacturing 906.

Further, in one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. For example, the electrically switchable window system may be installed as part of an upgrade or refurbishment of aircraft 1000 during routine maintenance and service 914. The electrically switchable window system may be used during operation of aircraft 1000 in service 912.

The use of a number of the different illustrative embodiments may substantially expedite the assembly of aircraft 1000, reduce the cost of aircraft 1000, or both expedite the assembly of aircraft 1000 and reduce the cost of aircraft 1000. The use of the electrically switchable window system may reduce weight and expense in manufacturing aircraft 1000. Maintenance of aircraft 1000 may be reduced through the reduction of the number of mechanical parts in aircraft 1000 using the electrically switchable window system in place of mechanical window shades.

Thus, one or more of the different illustrative examples provide one or more technical solutions to a technical problem with the use of mechanical shades in an aerospace vehicle, such as an aircraft. One or more illustrative examples provide a technical solution in which the weight and maintenance of an aircraft is reduced through the use of electrically switchable windows.

Further, the illustrative examples also provide a technical solution in which electrically switchable windows may be configured to change the amount of light passing through them more efficiently by crew members. The illustrative examples provide an ability to change the amount of light passing through the electrically switchable windows as a group by pilots using the onboard network system or by crewmembers using a control panel in or near a passenger cabin.

In other words, a centralized control of electrically switchable windows is provided. Further, the electrically switchable windows are part of a system that may be managed as a system on the onboard network system of an aircraft or other aerospace vehicle.

The description of or the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An electrically switchable window system for an aerospace vehicle, the electrically switchable window system comprising:
   electrically switchable windows in the aerospace vehicle;
   a window controller system connected to the electrically switchable windows, wherein the window controller system receives a group of wireless signals from an onboard network system that controls systems in the aerospace vehicle and changes voltages applied to the electrically switchable windows when the group of wireless signals are received; wherein the changes in the voltages change an amount of light passing through the electrically switchable windows;
   a battery device comprising a controller and a switch, the controller connected to the switch, wherein the battery device is connected to an electrically switchable window of the electrically switchable windows and applies the voltages to the electrically switchable window; and
   wherein the controller controls the switch between an open position such that the battery device can apply the voltages to the electrically switchable window and a closed position such that the battery device can be recharged, wherein the controller is capable of closing the switch when a determination is made that the aerospace vehicle is on the ground regardless of a charge level of the battery device and wherein the controller is capable of closing the switch when the charge level of the battery device is less than a predetermined threshold.

2. The electrically switchable window system of claim 1, wherein the window controller system receives a group of signals from at least one of a passenger switch or a control panel in a passenger cabin of the aerospace vehicle and changes the voltages applied to the electrically switchable windows in the aerospace vehicle when the group of signals are received.

3. The electrically switchable window system of claim 1 further comprising:
   a portable electronic device outlet connected to the battery device.

4. The electrically switchable window system of claim 1 further comprising:
   a power system connected to the battery device, wherein the power system charges the battery device when the switch is in the closed position.

5. The electrically switchable window system of claim 4, wherein the power system is selected from a group consisting at least one of an auxiliary power unit, an energy harvesting system, a solar panel, a piezo energy harvesting device, or a thermal energy harvesting device.

6. The electrically switchable window system of claim 1 further comprising:
   display devices associated with the electrically switchable windows.

7. The electrically switchable window system of claim 6, wherein the window controller system controls information displayed on the display devices.

8. The electrically switchable window system of claim 7, wherein the window controller system receives the information in the group of wireless signals from the onboard network system in the aerospace vehicle.

9. The electrically switchable window system of claim 1 further comprising:
   a control panel that sends a group of signals to the window controller system to change the voltages applied to the electrically switchable windows.

10. The electrically switchable window system of claim 1 further comprising:
    passenger switches connected to the electrically switchable windows, wherein the passenger switches are configured for use by passengers.

11. The electrically switchable window system of claim 1 further comprising:
    wireless devices selected from at least one of a wireless extender or a wireless repeater in the window controller system.

12. A method for controlling electrically switchable windows in an aerospace vehicle, the method comprising:
    receiving a group of wireless signals at a window controller system from an onboard network system in the aerospace vehicle, wherein the window controller system changes voltages applied to the electrically switchable windows when the group of wireless signals are received;
    changing, by the window controller system, the voltages applied to the electrically switchable windows in the aerospace vehicle when the group of wireless signals are received, wherein a change in the voltages changes an amount of light passing through the electrically switchable windows;
    determining a charge level of a battery device connected to the electrically switchable windows, the battery device comprising a controller and a switch, the controller connected to the switch;
    controlling the switch with the controller such that the switch is moved from an open position to a closed position to allow the battery device to be recharged, wherein the controller is capable of closing the switch when a determination is made that the aerospace vehicle is on the ground regardless of the charge level of the battery device and wherein the controller is capable of closing the switch when the charge level is determined to be less than a predetermined threshold; and
    controlling the switch with the controller such that the switch is moved from the closed position to the open position to allow the battery device to apply the voltages to the electrically switchable windows when the charge level is determined to be above the predetermined threshold.

13. The method of claim 12 further comprising:
    receiving, by the window controller system, a group of signals from at least one of a passenger switch and a control panel in a passenger cabin of the aerospace vehicle; and
    changing, by the window controller system, the voltages applied to the electrically switchable windows in the aerospace vehicle when the group of signals are received.

14. The method of claim 12 further comprising:
    sending power to the electrically switchable windows from a power system connected to the battery device and wherein the battery device supplies the power to the electrically switchable windows.

15. The method of claim 12, wherein a portable electronic device outlet is connected to the battery device.

16. The method of claim 12 further comprising:
charging the battery device using a power system in the aerospace vehicle connected to the battery device, wherein the power system charges the battery device under control of the controller.

17. The method of claim 16, wherein the power system is selected from a group consisting at least one of an auxiliary power unit, an energy harvesting system, a solar panel, a piezo energy harvesting device, or a thermal energy harvesting device.

18. The method of claim 12, wherein the window controller system displays information on display devices associated with the electrically switchable windows.

19. The method of claim 18, wherein the window controller system controls displaying of the information on the display devices and receiving the information at the window control system in the group of wireless signals from the onboard network system in the aerospace vehicle.

20. The method of claim 12 further comprising:
sending signals from a control panel to the window controller system to change the voltages applied to the electrically switchable windows.

21. An electrically switchable window system for an aircraft, the electrically switchable window system comprising:
electrically switchable windows in the aircraft;
a battery system connected to the electrically switchable windows, wherein the battery system applies voltages to the electrically switchable windows;
a window controller system connected to the electrically switchable windows, wherein the window controller system receives a group of wireless signals from an onboard network system in the aircraft and changes the voltages applied to the electrically switchable windows by the battery system when the group of wireless signals are received such that the changes in the voltages change an amount of light passing through the electrically switchable windows;
a battery device of the battery system comprising a controller and a switch, the controller connected to the switch, wherein the battery device is connected to an electrically switchable window of the electrically switchable windows and applies the voltages to the electrically switchable window; and
wherein the controller controls the switch between an open position such that the battery device can apply the voltages to the electrically switchable window and a closed position such that the battery device can be recharged, wherein the controller is capable of closing the switch when a determination is made that the aircraft is on the ground regardless of a charge level of the battery device and wherein the controller is capable of closing the switch when the charge level of the battery device is less than a predetermined threshold.

22. The electrically switchable window system of claim 21 further comprising:
a portable electronic device outlet connected to the battery device.

* * * * *